United States Patent [19]

Thomas et al.

[11] Patent Number: 4,587,799
[45] Date of Patent: May 13, 1986

[54] HARVESTER MACHINE FOR STRIPPING SEEDS FROM A STANDING CROP

[75] Inventors: Kenneth R. Thomas, Moline, Ill.; Neil L. West, Bettendorf, Iowa

[73] Assignee: Deere & Company, Moline, Ill.

[21] Appl. No.: 612,520

[22] Filed: May 21, 1984

[51] Int. Cl.[4] ............................................. A01D 45/30
[52] U.S. Cl. .................................... 56/14.6; 56/16.5; 56/126
[58] Field of Search ................... 56/126–130, 56/330, 14.6, 16.6, 16.5, 13.5, 13.3, 364

[56] References Cited

U.S. PATENT DOCUMENTS

| | | | |
|---|---|---|---|
| 1,255,209 | 2/1918 | Nelson | 56/130 |
| 2,526,141 | 10/1950 | Knowlton | 56/126 |
| 2,952,962 | 9/1960 | Suverkrop | 56/16.5 |
| 3,167,898 | 2/1965 | Gronberg | 56/16.5 |
| 3,430,633 | 3/1969 | Mark | 56/16.5 |
| 3,589,111 | 6/1971 | Gullichson | 56/14.6 |

Primary Examiner—Jay N. Eskovitz

[57] ABSTRACT

A harvesting machine includes a mobile main frame adapted to advance over a field of standing crop and including a forward header having an axially transverse stripping rotor with stripping elements that impact the seeds on the standing crop and deliver them rearwardly to a crop converging auger, which discharges the separated crop material through a housing to a blower type elevator. The elevator delivers the material to a rotary type cleaner that separates the seeds from some of the other crop material, the partially clean seeds then being delivered to a conventional combine cleaning shoe that finishes the separation of the seeds from the rest of the crop material, the seeds then being delivered to a clean grain conveying system.

12 Claims, 17 Drawing Figures

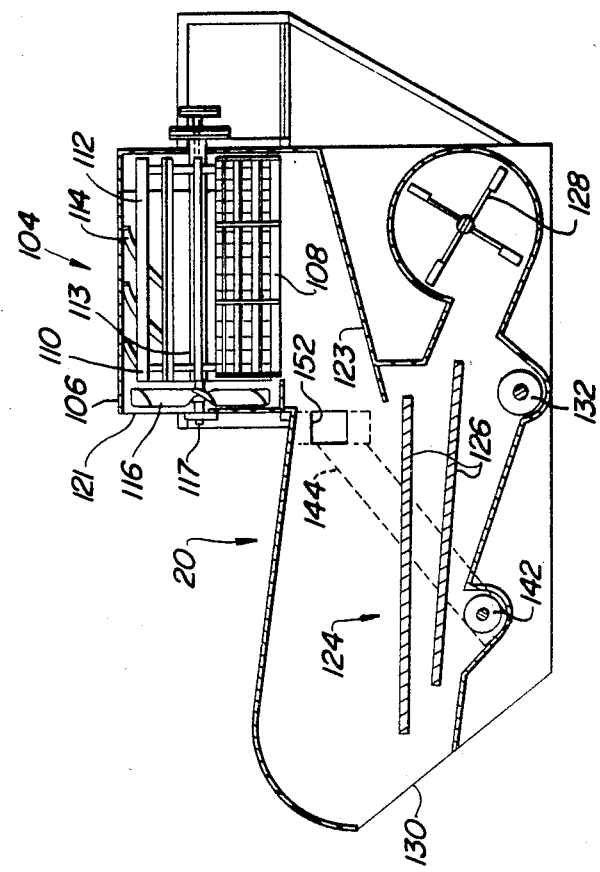

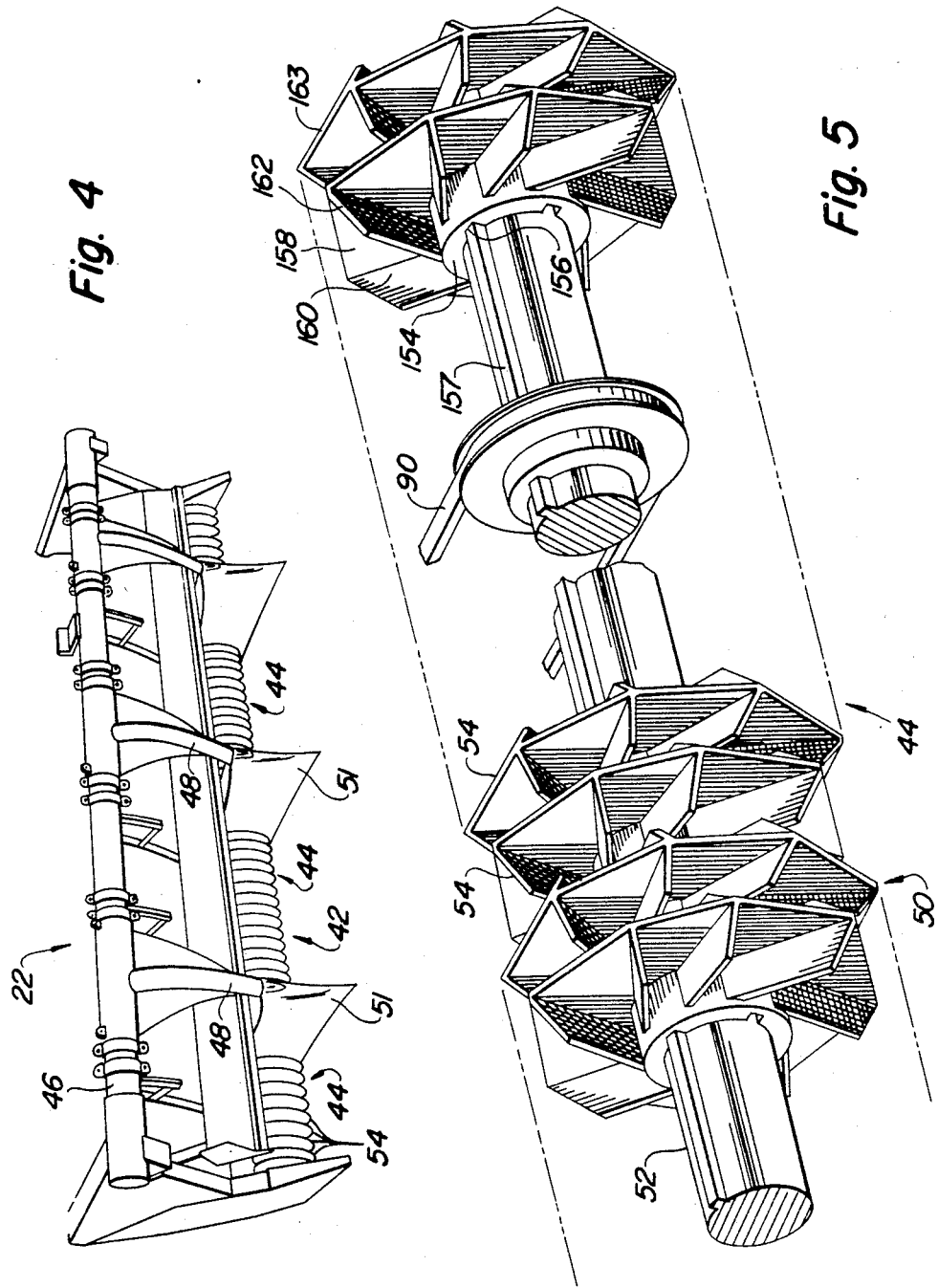

HARVESTER MACHINE FOR STRIPPING SEEDS FROM A STANDING CROP

BACKGROUND OF THE INVENTION

This invention relates to a grain harvesting machine and more particularly to a machine for stripping the seeds or grain from a standing crop while leaving the stem of the crop attached to the soil.

While most grain today is harvested by machines that sever the upper seed bearing portions of the crop material from the lower stem portions that are left attached to the soil, and then separate the grain or seeds from the rest of the crop material, it is known to harvest such crops by machines that do not sever the stems of the crop from the field, but rather strip the grain from the standing crop while leaving the stems of the crop attached to the ground. Such machines have the advantage of not taking a high volume of unwanted crop material into the machine, although some chaff or material other than grain is necessarily taken into the machine along with the seeds that are stripped from the standing crop. However, the reduced volume of crop material handled by such stripping machines does mean that the machine can be simpler and smaller than the conventional machines that handle the entire plant or substantial portions of the plant.

One such stripper type harvester is disclosed in U.S. Pat. Ser. Nos. 371,741 and 375,838, both of which are asssigned to the assignee herein. However, the grain stripper disclosed in said patent applications does not include means for cleaning the crop material stripped from the standing plant. In other cases, such as in U.S. Pat. No. 2,526,141, the stripping mechanisms are attached as headers for conventional combines, the material stripped from the crop being fed to the conventional combine for the separation and cleaning of the grain or seeds. However, the use of a conventional combine eliminates the size and simplicity advantages of a stripper type harvester.

Another type stripper harvester having a relatively simple type cleaning mechanism is disclosed in U.S. Pat. No. 3,739,907.

SUMMARY OF THE INVENTION

According to the present invention there is provided an improved stripper type harvester that includes improved means for handling and for separating the grain from the rest of the crop material that is stripped from the standing crop.

One feature of the invention resides in the provision of a two stage cleaning mechanism, the first stage of which is a relatively simple rotary cleaner that separates a substantial portion of the chaff and other material from the seeds, while the second stage consists of a more or less conventional cleaning shoe of the type that is used in modern combines.

Another feature of the invention resides in the provision of means for separating and collecting the unthreshed heads of grain and delivering said unthreshed heads to a rethreshing device which saves the grain that is not threshed by the stripping mechanism.

Another important feature of the invention resides in the provision of a relatively simple and compact machine that efficiently handles and cleans the grain after it is stripped from the standing crop.

Still another feature of the invention resides in the provision of an open center crop collecting auger behind the stripping rotors to reduce the loss of grain that bounces off the auger and out of the machine.

BRIEF DESCRIPTION OF THE DRAWINGS

FIG. 3 is a transverse vertical section of the rear cleaner portion of the machine as viewed along the line 3—3 of FIG. 2.

FIG. 4 is a front perspective view of the header portion of the machine that includes the stripping means.

FIG. 5 is an enlarged perspective view of one section of the stripping rotor.

DESCRIPTION OF THE PREFERRED EMBODIMENT

Figure 1:
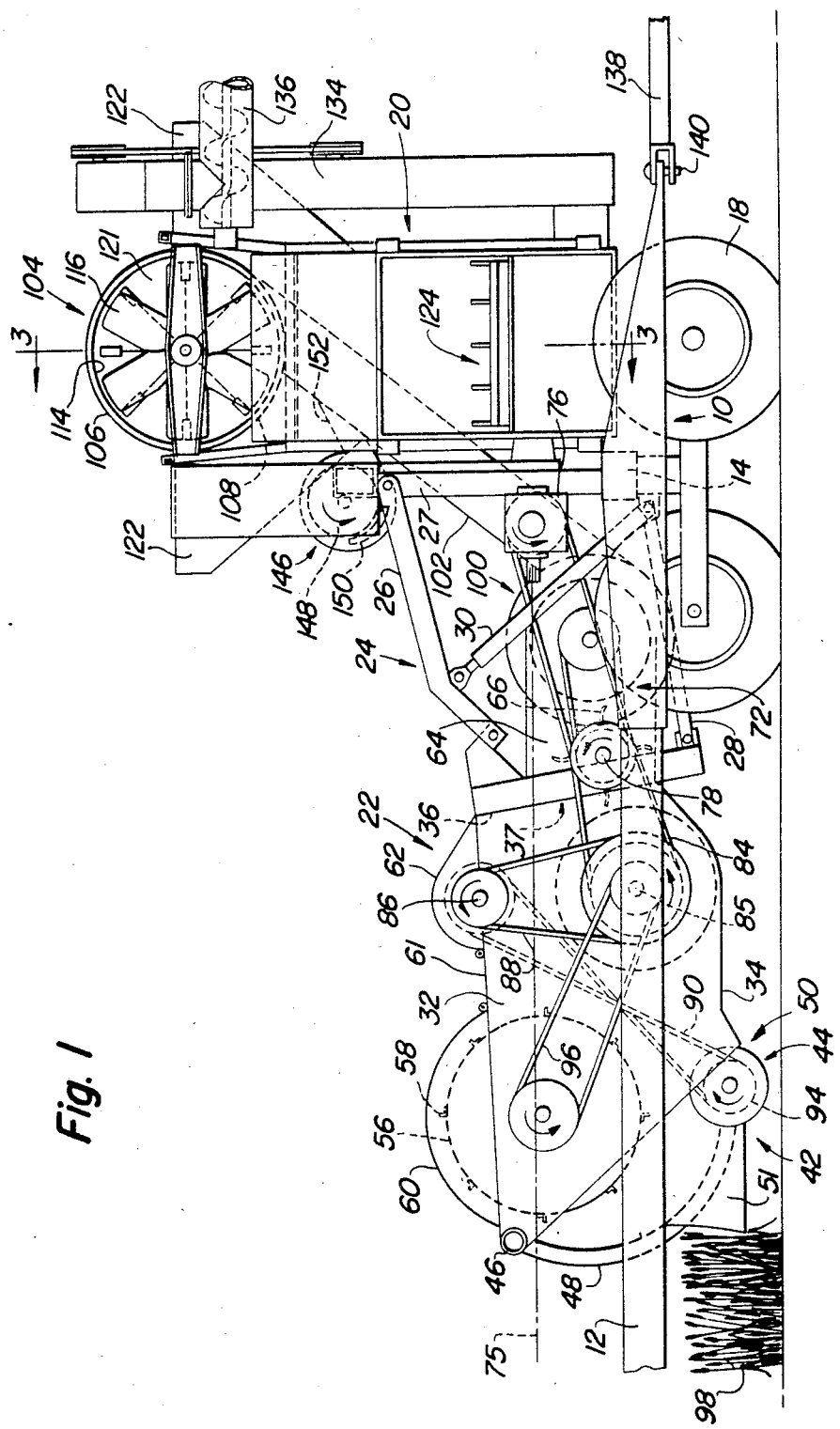
FIG. 1 is a side elevational view of the improved grain stripper, with some of the normally hidden machine components shown in dotted lines.

The invention is embodied in a pull type harvesting machine having an L-shaped main frame 10 that includes a generally fore-and-aft tongue 12 on the left side of the machine and a rearward transverse beam 14, the rearward portion of the main frame being supported on a pair of wheels 16 at the right hand end of the beam 14 and a pair of wheels 18 adjacent the connection between the tongue and the transverse beam 14 at the left side of the frame. The front end of the tongue is connected to and supported on a tractor (not shown) in the conventional manner, the tractor also supplying the power for the harvester machine through a conventional PTO drive system.

An upright transversely extending cleaner body 20 is mounted on the transverse beam 14 and extends substantially the width of the beam 14. A transversely elongated header 22 also extends essentially the width of the machine forwardly of the beam 14, the header 22 being mounted for vertical adjustment relative to the frame by means of a parallel linkage type suspension system 24.

The suspension system includes a pair of generally fore-and-aft upper links 26 having their forward ends pivotally connected to the upper rear portion of the header and their rearward ends pivotally connected to the upper ends of vertical posts or support members 27 that extend upwardly from the transverse beam 14. The suspension system also includes a pair of transversely spaced, generally fore-and-aft lower links 28 respectively below the upper links 26, the forward ends of the lower links being connected to a lower rear portion of the header and the rearward ends of the lower links being pivotally connected to the transverse beam 14. A pair of hydraulic cylinders 30 extend upwardly and forwardly from the rearward ends of the lower links 28 to the upper links 26 a short distance to the rear of the connection between the upper lengths and the header. As is apparent, extension of the hydraulic cylinders 30 will cause the header 22 to raise from the position shown in FIG. 1 at a substantially constant attitude, so that the cutting height of the header can be adjusted by extending or retracting the cylinder 30.

The header 22 includes an upright right side panel 31, an upright left side panel 32, a generally horizontal floor 34 extending between the opposite side panels and curving upwardly into a generally upright rear wall 36 that includes a central crop discharge opening 37.

Mounted on the header 22 immediately in front of the rear wall 36 is a transverse crop converging auger 38 that extends between the opposite side panels 31 and 32, the central portion of the auger 38 being provided with a finger type feed mechanism 40 immediately in front of the discharge opening 37, whereby the auger converges the crop material on the header and discharges it rearwardly through the discharge opening 37 in the conventional manner.

A transversely elongated stripper mechanism, indicated in its entirety by the number 42, extends between the opposite side panels at the forward end of the floor 34. The stripping mechanism 42 includes a plurality of independent stripping units or modules 44 that are independently vertically deflectable should the unit or module strike an obstruction. In the embodiment shown in FIGS. 1 and 2, the stripping mechanism 42 includes four independent units 44, while the header shown in FIG. 4 includes only three units. The stripping units 44 are mounted side-by-side and are closely spaced so that the units conjunctively span the entire width of the header. Each unit or module 44 is suspended from a transverse support tube 46 that extends between the opposite side panels at the upper forward end of the header, the modules being independently suspended from the support tube 46 by means of downwardly and rearwardly curved arms 48 having their upper ends pivotally connected to the support tube and their lower ends journalling a stripping rotor 50 that is included in each stripping unit 44. A generally upright divider 51 surrounds the lower end of each arm 48 forwardly of the connection between the arm and a shaft 52 of the rotors so to deflect crop material around the arm 48 and into a plurality of disk like stripping elements 54 that are mounted side-by-side on the rotor shaft 52 and keyed thereto. The construction of several versions of the stripping elements 54 will be described in greater detail hereinafter.

Figure 2:
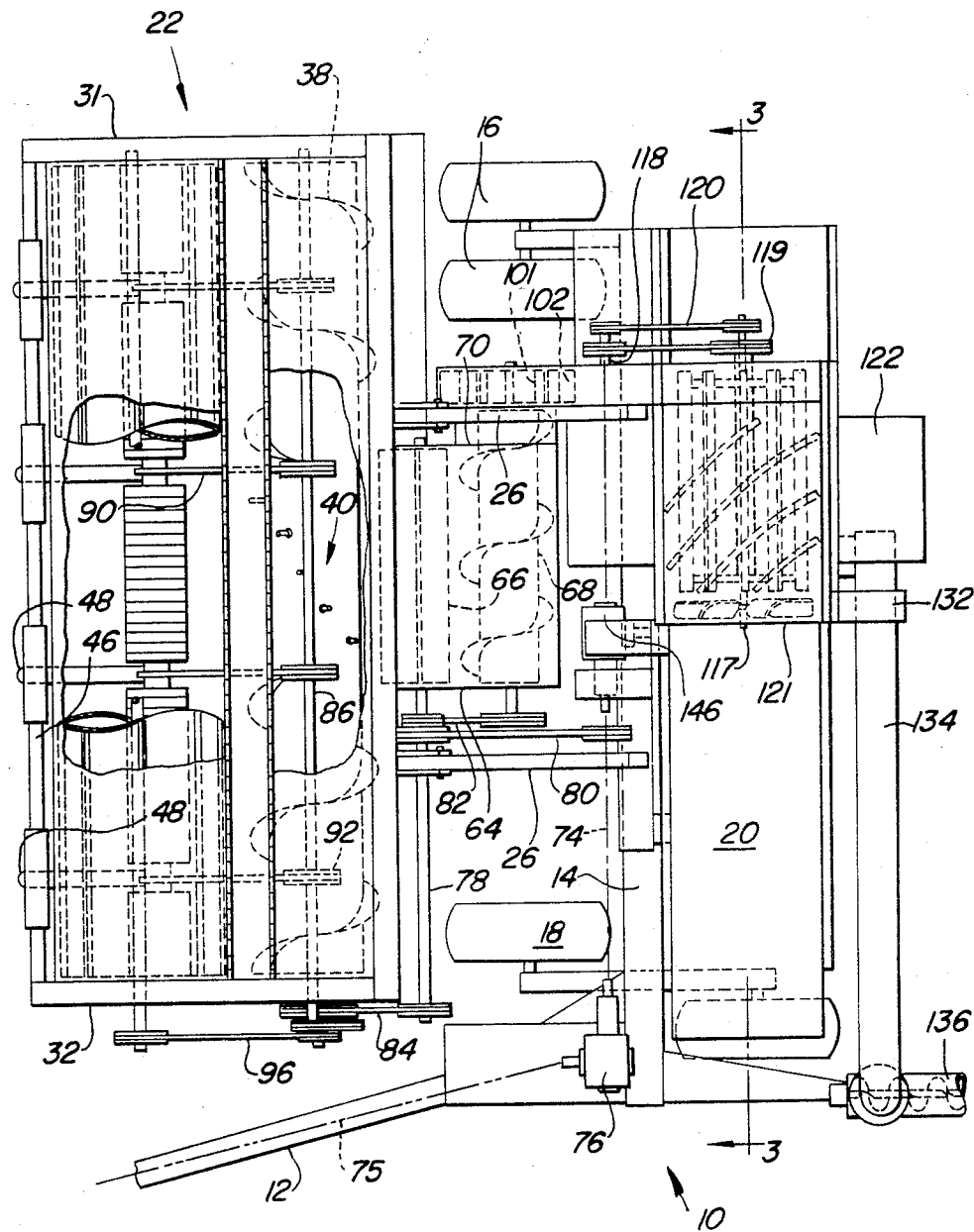
FIG. 2 is a top plan view of the grain stripper.

In the embodiment of the header shown in FIGS. 1 and 2, a relatively large drum type upper rotor 56 is mounted on the header above the stripping units 44, the upper rotor extending between the opposite side panels.

The upper rotor is formed by a relatively large diameter cylindrical drum having an axial shaft 57 and a plurality of relatively short axially extending ribs or vanes 58 that extend outwardly from the drum, the vanes 58 having a relatively short radial dimension and being formed by axially extending angle irons fastened to the outer surface of the drum. A concave front hood 60 overlies the upper portion of the drum generally coaxially thereto, the hood 60 spanning the width of the header and being connected thereto by a transverse pivot so that the hood can be swung upwardly to provide access to the forward portion of the header. A top panel 61 extends between the opposite sides of the header rearwardly of the front hood, and a rear hood 62 extends between the rear edge of the top panel 61 and the upper end of the rear wall. The rear hood is downwardly concave and is swingable upwardly about a transverse pivot at its forward end to provide access to the auger 38 that is disposed beneath the rear hood.

Figure 14:
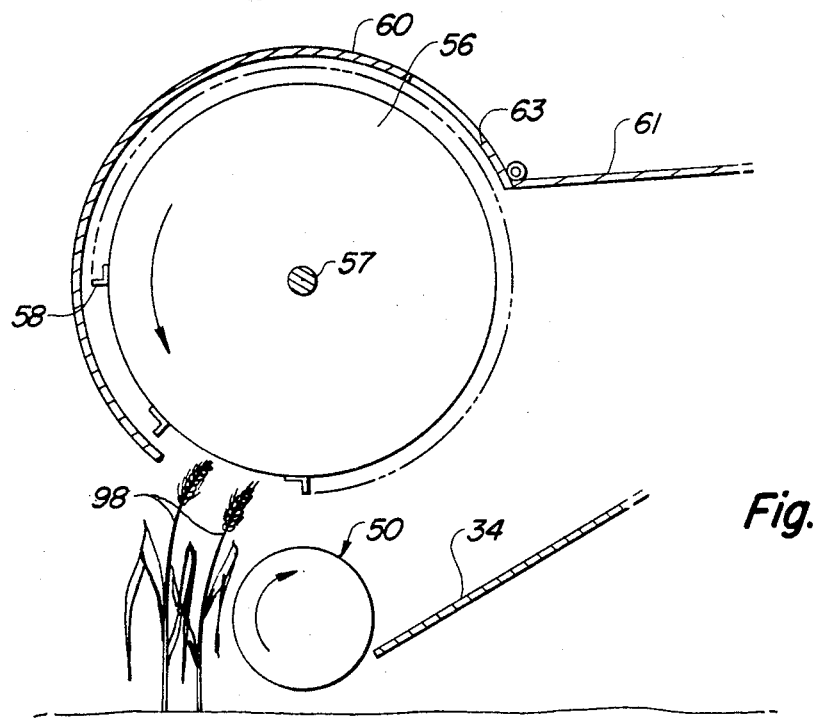
FIG. 14 is a somewhat schematic fore-and-aft vertical section through the stripper portion of the header.

As best shown in FIG. 14, the front hood 60 is provided with air inlet openings 63 that are disposed side-by-side across the width of the hood adjacent the hood pivot. The upper rotor 56 is rotated in the direction of the arrow in FIG. 14, and the vanes 58 of the rotating drum create an air flow, that moves in through the inlet openings 63 and discharges in a downward and rearward air blast at the lower front edge of the hood 60.

Figure 15:
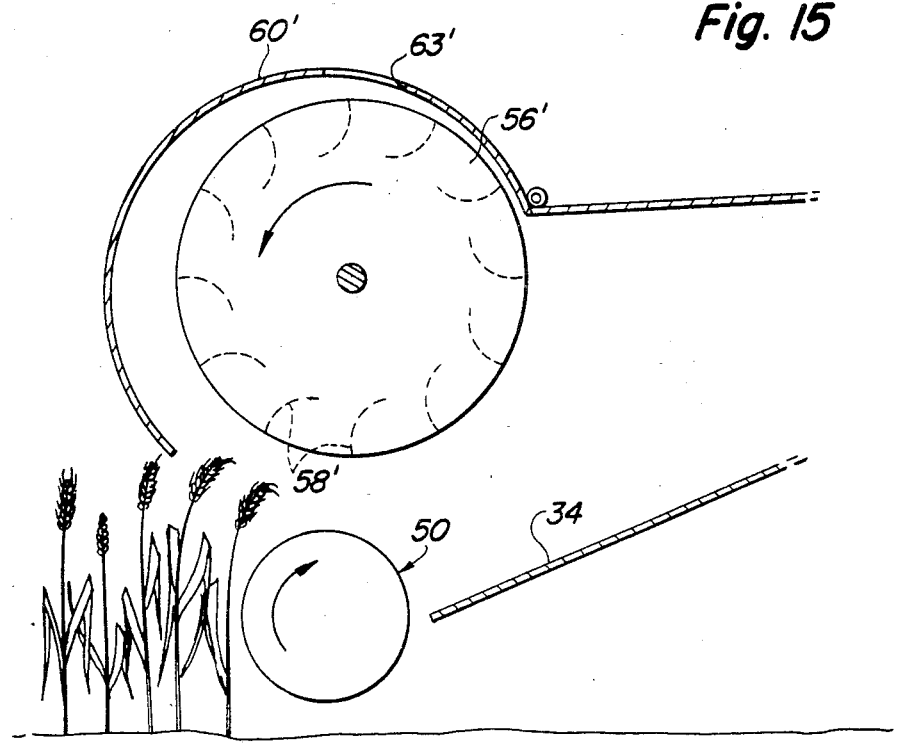
FIG. 15 is a view similar to FIG. 14, showing a different embodiment of the upper rotor of the stripping mechanism.

An alternate design of the upper rotor is shown in FIG. 15, wherein the rotor is indicated by the numeral 56 and is provided with concave vanes 48 of the type used in a conventional drawn type blower. The rotor is provided with a concave hood 60 that is nonconcentric with the rotor to provide an increasing gap between the rotor and the hood in the direction of rotation. The hood again is provided with air inlet openings 63. The rotor embodiment shown in FIG. 15 is capable of generating a substantially greater air flow that is directed downwardly and rearwardly against the heads of standing grain to direct the heads into the stripping rotors 50.

A feeder housing 64 extends rearwardly from the header rear wall 36 in communication with the header discharge opening 37, and an axially transverse beater 66 extends between the opposite sides of the feeder housing at the forward end thereof in crop receiving relationship with the finger type feeder 40 on the header. A transverse auger 68 is disposed in the feeder housing 64 immediately behind the beaters 66 and is operative to move crop material from the beater laterally to the right side of the feeder housing and through a discharge opening 70 on the right side of the feeder housing.

The stripping rotors 50, the upper rotor 56, the auger 38, and the beater 66 are all rotated in the direction of the arrows in FIG. 1 by a belt type drive system, indicated generally by the numeral 72. The drive system 72 is driven from a main transverse input shaft 74 that is connected to a fore-and-aft drive shaft 75 (schematically illustrated by its centerline) through a gear box 76, the forward end of the drive shaft 75 being connected to the tractor power take-off (not shown) in the conventional manner. The main transverse input shaft 74 is connected to a header drive shaft 78 by means of a belt drive 80, the header drive shaft being journalled on the rear side of the header and being drivingly connected to the beater 66. A belt drive 82 adjacent to the belt drive 80 connects the header drive shaft 78 to the feeder house auger 68. A belt drive 84 at the left end of the header drive shaft 78 drives a transverse shaft 85 that is drivingly connected to the auger 38 and also drivingly connected to a top countershaft 86 by a belt drive 88. The countershaft 86 extends the width of the header underneath the rear hood 62, and belt type drives 90 connect the shaft 86 to the shafts 52 of the respective rotors 50, each rotor drive including an upper drive sheave 92 connected to the shaft 86 and a lower sheave 94 connected to the rotor shaft 52. A belt type drive 96 also drivingly connects the shaft 85 to the upper rotor 56.

As is apparent, the grain bearing heads of the standing crop 98 are generally above the axis of the lower stripping rotor 50 and below the axis of the drum type upper rotor 56. The front side of the stripping mechanism rotors 50 are moving upwardly, so that when the stripping elements 54 engage the heads of the standing crop, the heads are impacted in an upward direction. The upper drum type rotor 56 assists in the rearward movement of the separated crop material rearwardly to the auger 38, which converges the crop toward the center of the header and feeds it rearwardly through the discharge opening 37. The crop material moving through the discharge opening is engaged by the rotating beater 66 which feeds the auger 68, which in turn, moves the crop material laterally in the feeder houses through the discharge opening to a blower type elevator 100 on the right side of the feeder housing. The elevator 100 includes a rotary blower type impeller 101 that engages the crop material and impells it tangentially upwardly and rearwardly through a chute 102 to a rotary type precleaner 104 on the cleaner body 20. The chute 102 telescopes to accommodate the vertical adjustment of the header relative to the body 20 that is rigid with the main frame.

The rotary type precleaner 104 includes a generally cylindrical housing 106 that is transversely oriented relative to the direction of travel. The lower half of the housing 106 comprises a semi-cylindrical screen or grate 108 that allows the passsage of the grain but not the straw that is removed from the standing crop by the stripping mechanism. The elevator 102 communicates with the right hand or intake end of the housing 106 in a crop feeding arrangement, and a cleaner rotor 110 mounted within the cylindrical housing 106 engages the crop material upon its entry into the housing 106. The rotor 110 includes a plurality of axially extending blades 112 at the rotor periphery and mounted on a shaft 113, the blades 112 moving close to the inside surface of the housing 106 to move the crop material around the inside of the housing and across the screen 108. Guide vanes 114 are provided along the upper portion of the housing 106 to engage the crop material moving along the inside of the housing and to advance it towards the discharge end of the cleaner (to the left in FIG. 3). A suction type fan 116 is mounted on a shaft 117 that coaxially extends through the rotor shaft 113. The fan 116 is driven at a higher speed than the rotor 120, both of said elements being driven from a transverse drive shaft 118 that is connected to and driven by the main transverse input shaft 74. The fan shaft 117 is connected to the drive shaft 118 by a belt drive 120 and the rotor shaft 113 is connected to the drive shaft 118 by a belt drive 119.

The fan 116 is mounted in the left or discharged end of the precleaner housing 106 adjacent a housing outlet 121. An upwardly open air inlet housing 122 surrounds the screen 118, so that air is sucked in through the inlet housing 122 and passes radially inwardly through the screen 108 and is then discharged through the outlet 121. The heavier grain falls through the screen 108 onto a downwardly and laterally inclined pan 123 while the lighter straw and chaff is entrained in the air and discharged through the outlet 121. The grain and other material mixed therewith slide down the pan 123 to a conventional combine cleaning shoe 124 that is transversely oriented within the body 20. As is well known, the cleaning shoe includes a pair of reciprocating screens or grates 126, and a blower 128 blows air through the screens 126 and out the cleaner outlet 130, entraining the chaff in the air stream while the grain falls through the screen 126. The grain falling through the front or right hand portion of the cleaning shoe 122 is directed to a fore-and-aft clean grain auger 132 that moves the clean grain rearwardly to a clean grain elevator 134 that feeds an elevated swingable discharge auger 136. The discharge auger is adapted to convey grain rearwardly to a grain collecting trailer, only the tongue 138 of the trailer being shown in FIG. 1. The trailer tongue 138 is connected to the rear of the main frame 10 by a hitch 140.

The heavier materials dropping through the rear or left-hand end of the cleaning shoe 122 are known as tailings and are collected by a fore-and-aft extending tailings auger 142 that moves the tailings forwardly to a tailings elevator 144 that extends upwardly and laterally on the front side of the cleaner body 20. The elevator feeds the tailings to a tailings rethresher 146 that includes a small threshing cylinder 148 and an associated closed concave 150, such tailings rethreshers being well known and appearing on some commercial machines. The rethreshed tailings are discharged tangentially through an upwardly and rearwardly extending discharge chute 152, from which they are dropped onto the front of the cleaning shoe 124, the rethreshed material thus being recycled through the cleaning shoe.

Turning now to the specific construction of the stripping units 44 and more specifically to the construction of the stripping elements 54 of the stripping units, several different embodiments of the stripping elements are shown in the drawings.

In FIG. 5, a number of the stripping elements are shown mounted side-by-side on the rotor shaft, although some of the elements 54 are omitted to show the rotor drive at the center of the stripping unit 44. Each stripping element 54 is identical, and, therefore, only one element will be described in detail. The stripping element 54 includes an annular hub 154 having a pair of axially extending internal keyways that are adapted to receive an axially extending key 157 that extends the length of the shaft 52. By mounting the stripping element on the shaft with the key 157 disposed in alternate keyways 156, the angular orientation of the stripping elements can be varied, the orientation of the stripping elements 54 in FIG. 5 being alternated so that adjacent elements have a different angular orientation.

Each stripping element includes a central radially extending annular disk or web portion 158 coaxially attached to the hub 154 and a plurality of ribs 160 extending outwardly from the hub 154 to the periphery of the web portion 158. The ribs 160 extend from opposite sides of the web portion with the portions of the ribs on opposite sides of the web portion being mirror images of one another and axially aligned. The ribs include lateral edges that are spaced a short distance inwardly from the opposite ends of the hub, so that when the stripping elements 54 are mounted on the shaft with their hubs 154 abutting one another, there is a short gap between the edges of the ribs 160. In the stripping elements illustrated in FIG. 5, the ribs are straight and project outwardly from the hubs in a general tangential fashion, with the outer end of each rib being angularly advanced from the inner end of the rib relative to the direction of rotation of the stripping element. The outer portions 162 are tapered to a point at the periphery of the web portion 158 so that the ribs on opposite sides of the web portion formed V-shaped outer portions 162. In the embodiment shown in FIG. 5, the outer edges 163 of the web portion 54 between adjacent ribs is straight, and since eight ribs are provided on the illustrated embodiment, the web portion is generally octagonal in shape.

Figure 7:
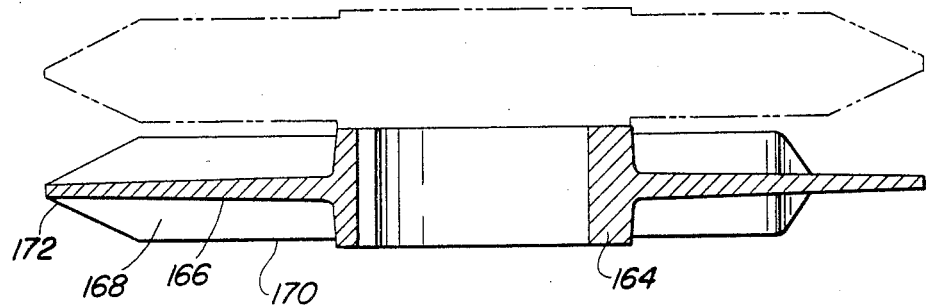
FIG. 7 is a sectional view of the stripping element shown in FIG. 6 as viewed along the line 7—7 of FIG. 6, an adjacent stripping element being shown in outline only.
Figure 6:
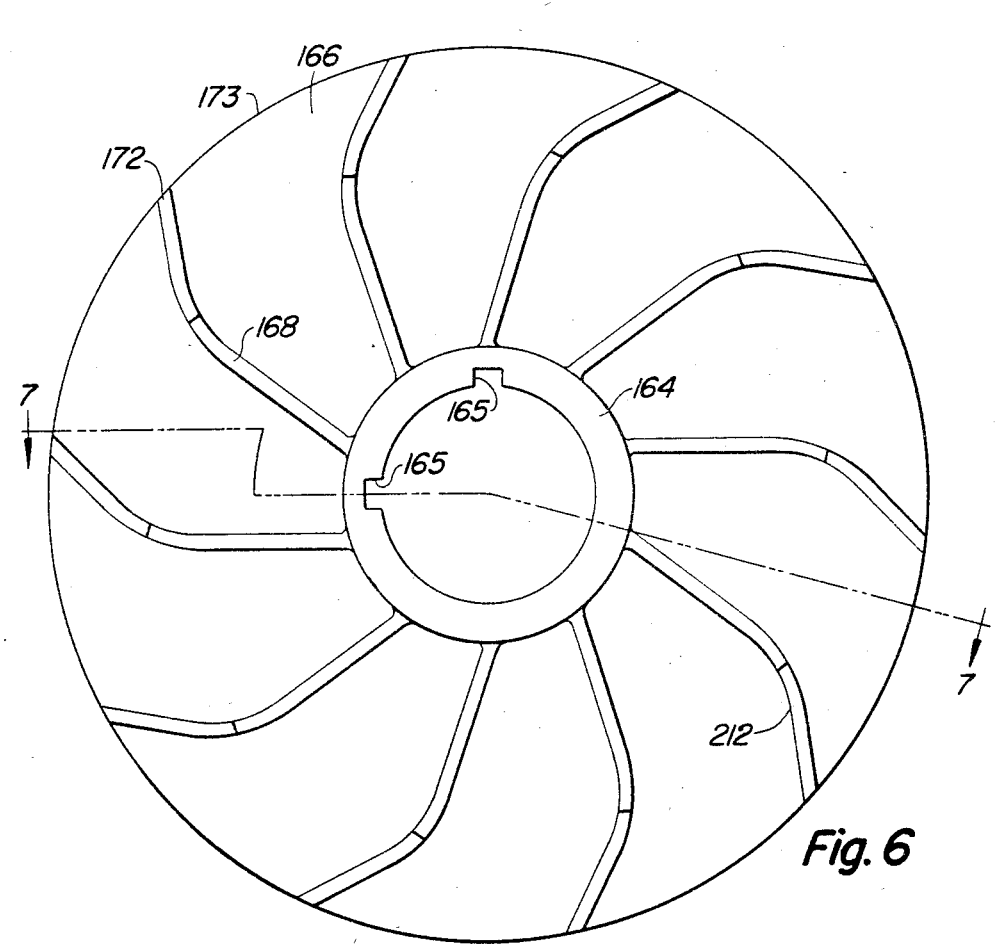
FIG. 6 is a side elevational view of one of the stripping elements on the stripping rotor.

A slightly different embodiment of the stripping element 54 is shown in FIGS. 6 and 7, where the stripping element is again provided with a hub 164 having a pair of keyways 165 that permit the stripping elements to be staggered on the rotor shaft. The stripping element includes an annular disk-like web portion 166 and a plurality of ribs 168 that extend outwardly from the hub to the periphery of the web portion 166. The ribs again have outwardly extending lateral edges 170 that are spaced a short distance inwardly from the radial end face of the hub and, as best seen in FIG. 7, where a second stripping element is shown in outline adjacent to the illustrated stripping element, when the stripping elements are mounted on the shaft with the hubs abutting one another, there is a slight gap between the lateral edges 170 of the ribs 168. As best seen in FIG. 6, the ribs include hook-like outer end portions 172 that are curved in a rotationally advanced direction from the generally straight inner portions of the ribs, and, as shown in FIG. 7, the outer portions are also tapered to a point at the outer periphery 173 of the web portion. The outer periphery 173 of the web portion in the embodiment illustrated in FIGS. 6 and 7 is circular.

Figure 8:
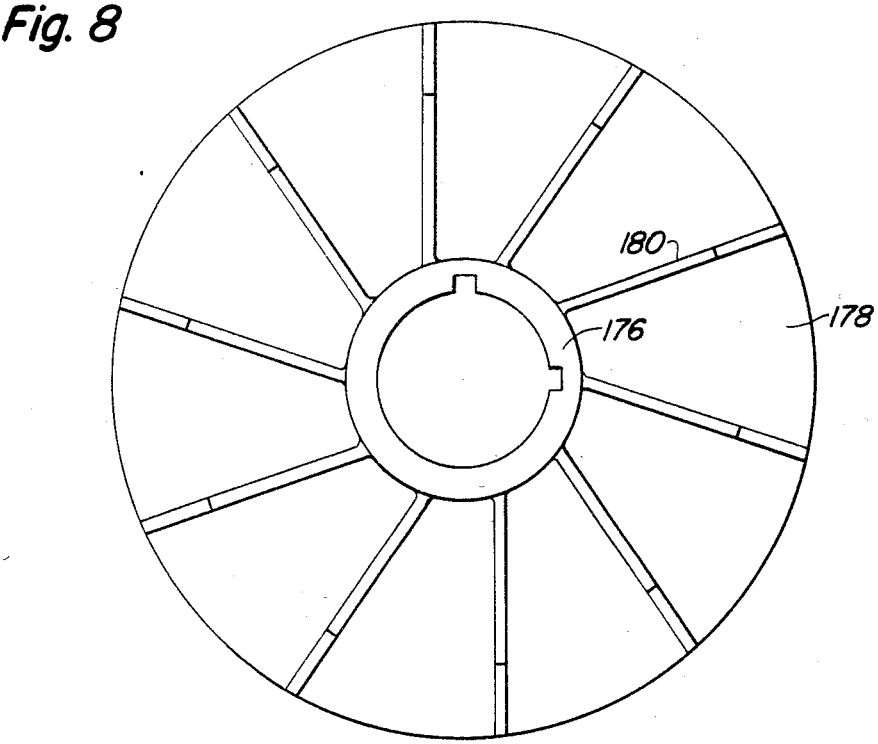
FIG. 8 is a side view similar to FIG. 6, but of a different embodiment of the stripping element.
Figure 9:
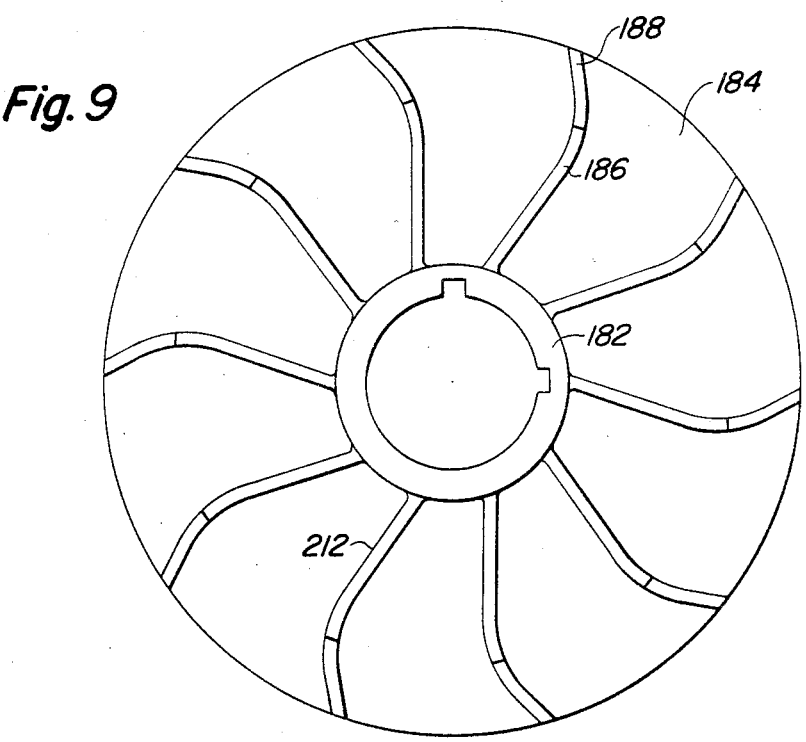
FIG. 9 is a side view of a third embodiment of the stripping element.

Two more embodiments of the stripping element are respectively shown in FIGS. 8 and 9. The stripping elements in FIG. 8 again include an annular hub 176 with a disk-like annular web portion 178 coaxially attached to the hub portion as in the previously described embodiment. However, the stripping element is provided with generally straight ribs 180 similar to the ribs shown in FIG. 5. In the embodiment shown in FIG. 9, the hub and web portions 182, 184 are respectively the same as those shown in FIG. 8. However, the stripping element is provided with ribs 186 with hook-like outer end portions 188 that are similar to the outer end portions 172 in FIG. 6, except that the outer end portions are bent in an angularly reverse direction relative to the straight inner ends of the ribs, the stripping element being rotated in a clockwise direction in FIG. 9.

Figure 10:
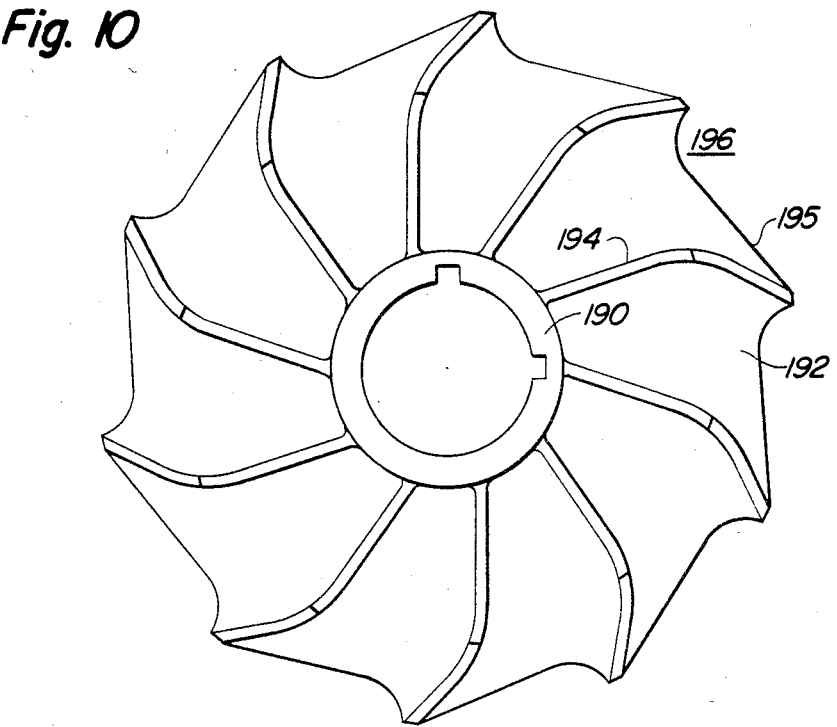
FIG. 10 is a side view of a fourth embodiment of the stripping element.

A fifth embodiment of the stripping element is illustrated in FIG. 10 where the stripping element is again provided with a hub 190 identical to the previously described hubs. A disk-like web portion 192 again is coaxially mounted on the hub and a plurality of ribs 194 similar to the ribs shown in FIG. 6 extend outwardly from the hub with tapered and hooked outer ends extending in an angularly advanced direction relative to the direction of rotation. The ribs again terminate at an apex at the web portion outer periphery 195, which is provided with a recess 196 between the outer ends of each pair of adjacent ribs. The recess is deeper immediately on the rotationally advanced side of the rib.

Figure 13:
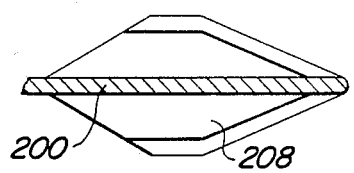
FIG. 13 is a partial sectional view of the stripping element shown in FIG. 11 as viewed along the line 13—13 in FIG. 11.
Figure 12:
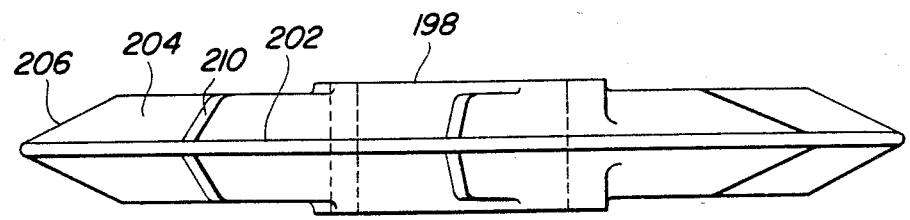
FIG. 12 is a front view of the stripping element shown in FIG. 11.
Figure 11:
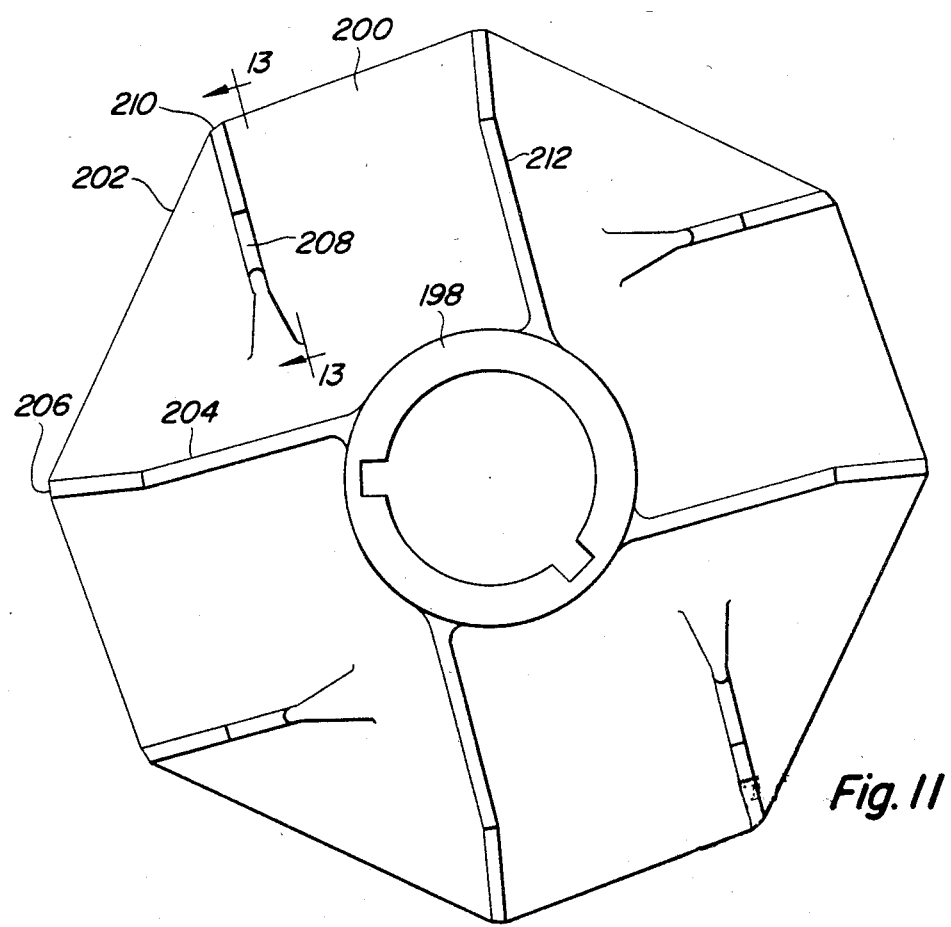
FIG. 11 is a side view of a fifth embodiment of the stripping element.

The final embodiment of the stripping element is shown in FIGS. 11-13, where the stripping element is again provided with an annular hub 198 with a disk-like web portion 200 having a generally octagonal outer edge 202. Four large ribs 204 extend outwardly from the hub 198 to the outer edge 202, with adjacent ribs 204 extending to alternating corners of the octagonal shaped outer edge. Again, the ribs 204 have V-shaped outer ends 206 that taper to an apex at the outer edge 202. As shown in FIG. 11, the large ribs 204 are generally tangential to its hub 198 and are inclined in a rotationaly retarded direction relative to the direction of rotation, which is clockwise in FIG. 11. Four smaller ribs 208 project from opposite sides of the web portion 200 in a generally perpendicular direction from the leading side of the larger ribs 204, the inner ends of the small ribs 208 being spaced from the hub, while the outer ends 210 of the small ribs 208 like the outer ends 206 of the larger ribs are tapered and disposed at the corners of the outer edge 202 of the web portion.

Figure 16:
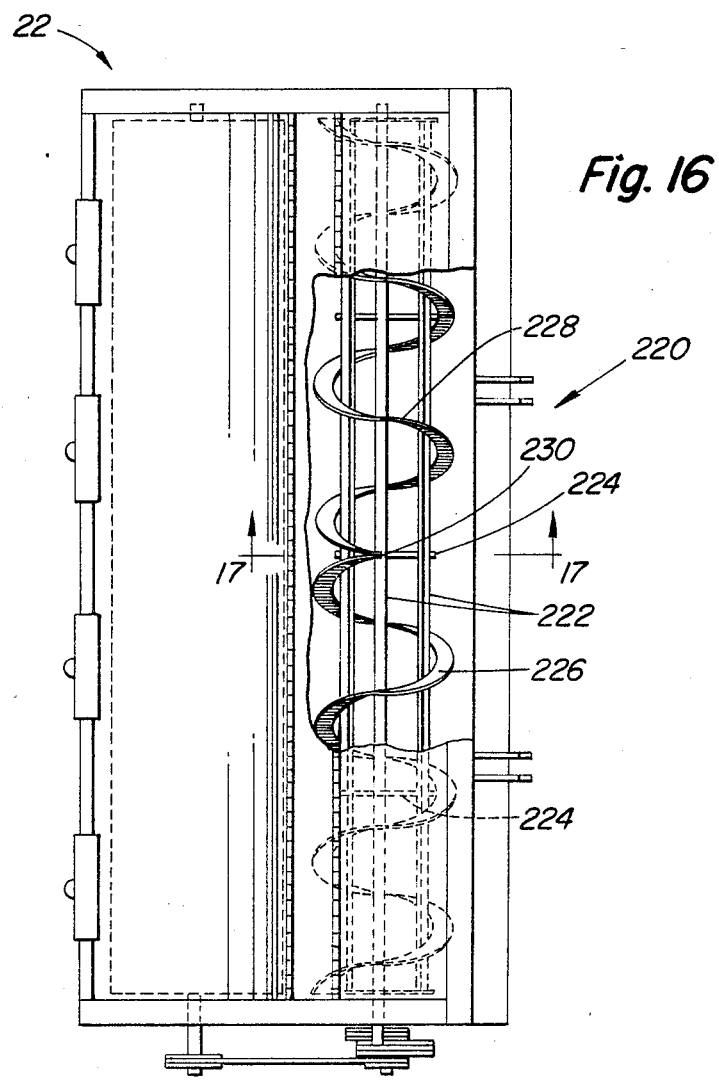
FIG. 16 is a plan view of the header portion of the machine with portions of the hood removed to show a second embodiment of the converging auger.
Figure 17:
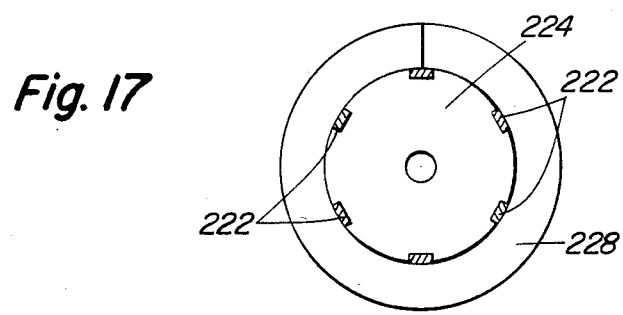
FIG. 17 is a vertical cross section of the auger viewed along the lines 17—17 of FIG. 16.

In the embodiment shown in FIGS. 16 and 17, a different crop converging auger 220 is provided. The auger 220 is an open center auger that does not include the conventional auger tube. Instead, the auger is formed by a plurality of axially extending bars 222 that are equally spaced and equally offset from the auger axis, the bars being welded to the periphery of a plurality of axially spaced discs 224 so that they form a tubular cage. In the illustrated embodiment, six bars are provided at equal 60 degree spacing about the disc. Welded to the bars are oppositely wound spiral flights 226 and 228, which meet at an apex 230 at the center of the header. The flights are similar to those on a conventional auger and are operative to move crop material along the floor to the center of the platform as the auger is rotated in a counterclockwise direction (FIG. 17). The pocket in the flighting at the apex 230 assists in discharging the crop material rearwardly through the header discharge opening 37.

In operation, the stripper type harvesting machine is towed over a field of standing crop which is illustrated by the numeral 98 in FIG. 1. The height of the harvester header 22 is adjusted so that the seed or grain bearing heads of the crop, which are at the upper end of the crop stems, are disposed generally above the axis of the stripping unit's rotor 50, but below the axis of the drum type upper rotor 56, as shown in FIG. 1. The stripping rotors 50 are rotated in a clockwise direction with the front side of the rotor moving upwardly, as viewed in FIG. 1 and the upper rotor 56 is rotated in a counterclockwise direction, with the front side of the rotor moving downwardly. The vanes 58 on the upper rotor 56 create an air flow inwardly through the air inlet 63, the air flow moving between the rotor and the drum and being discharged downwardly and rearwardly at the outlet at the lower end of the hood 60. The air stream leaving the hood 60 is directed against the heads of standing grain, as best shown in FIG. 14, so that the heads of the grain are deflected downwardly into the stripping rotor 50. The air stream also helps to move grain separated from the standing crop rearwardly, the air stream assisting in the movement of the crop along the floor 34 to the auger 38, which in turn converges the crop and discharges it rearwardly through the header discharge opening to the harvester feeder housing 64.

Since the grain stripped by the rotors and assisted by the air flow is moving rearwardly at a relatively high velocity, there is a considerable impact when the grain strikes the auger, which, in some cases, results in some grain bouncing forwardly and being lost out the front of the machine. It has been discovered that the open center auger illustrated in FIGS. 16 and 17 eliminates the bouncing of the grain off the auger tube, which substantially reduces the loss of grain out the front of the machine.

In certain crops, it is desirable to have a greater volume of air directed downwardly and rearwardly at the grain heads and rearwardly to assist in the movement of the stripped grain and other crop material rearwardly to the auger, and the blower illustrated in FIG. 15 is provided with internal vanes 58 that are well known for drum type blowers and are more effective in creating a greater volume of air flow.

As previously described, the stripping mechanism includes three or four independent stripping units or modules 44 that are independently suspended and driven so that each module is free to swing upwardly and rearwardly independently of the other modules should the stripping unit strike an obstruction or engage the ground because of uneven terrain. Each stripping unit or module is provided with a rotor 50 that has a plurality of disk-like stripping elements 54 that are mounted side-by-side on a shaft and extend the width of the stripping unit. As previosly described, each stripping element includes a disk-like web portion on a hub with a plurality of ribs projecting laterally from opposite sides of the web portion, the ribs extending in an approximate radial direction from the hub to the periphery of the stripping element.

Although various specific designs for the stripping elements are disclosed, they are of the same general construction, and in each stripping element, the axial width of the ribs is less than the axial width of the hub, so that the lateral edges of the adjacent ribs are spaced a short distance apart, as shown in FIG. 7, even though the hubs are mounted on the shaft in abutting relationship. The spacing between the ribs on adjacent stripping elements is sufficient to allow the passage of the stems of the crop 98, but insufficient to allow the passage of the seed bearing or grain bearing heads, which are impacted by the rib faces on the rotationally advanced side of the ribs in FIGS. 6–12. The impact of the ribs on the grain bearing heads is in a stemwise direction, and when the stripping elements are driven at an appropriate speed, such as disclosed in said U.S. patent application Ser. No. 375,838, the grain literally explodes from the seed bearing head and is propelled rearwardly by tangential force and by the air flow created by the upper drum 56. Of course, the aggressive stripping element also removes some of the remaining part of the grain bearing head, which is mixed with the grain and propelled rearwardly to the auger 38. The stripping element illustrated in FIGS. 6 and 7 has an outer portion that is inclined or hooked in the direction of rotation and has a more aggressive stripping action which is preferable for certain crops. On the other hand, the stripping element shown in FIG. 9 has its outer ends inclined in a retarded direction, providing a more gentle threshing action, while the stripping element shown in FIG. 8 has straight ribs that provide a threshing action somewhere between the threshing action provided by the stripping elements shown in FIGS. 7 and 9. In the stripping element shown in FIG. 10 recesses are cut in the outer periphery of this stripping element in advance of each rib, and this construction provides a still more aggressive stripping action.

Preferably, the stripping elements are made of cast aluminum or the like to reduce the weight of the header. However, a stripping element can be made of molded rubber which, while not as effective in providing the stripping action, do have an advantage when operated on rocky terrain, since the stripping elements are able to elastomerically deform and absorb the shock of the stripping rotor striking a rock in the field. It has been found that rubber compounds varying in hardness from 70 to 90 durometers have been satisfactory for the stripping elements with the lower durometer compounds being less effective to strip crop material, but better able to encounter rocks without taking a permanent set, while the higher durometer rubber is more effective as a stripper, but more susceptible to damage when striking a rock.

In the illustrated embodiment, the stripping elements have an approximate diameter of 30 cm and the lower rotor is rotated in the range of 1350 to 1820 rpm. Obviously, at the higher rotational speeds, the stripping rotor is more aggressive and will have a lesser loss even in hard to thresh crops. However, at the higher rotational speeds, the stripping rotor will remove more material other than grain from the standing crop and although the losses may be less, a greater burden is placed on the harvesting machine cleaning mechanism. Simarily, the more aggressive designs for the stipping elements create less loss at the header, but also strip more material other than grain from the standing crop to increase the demand on the cleaning mechanism.

It is possible to eliminate the upper drum 56, as illustrated in FIG. 4, which reduces the power requirement for the harvester since the air generating drums consume a substantial amount of power. However, removal of the upper drum or the rotation of the upper drum at a slower peripheral speed than the preferred speed of 400–500 rpm for a 0.78 m diameter drum, does increase the gathering loss.

As previously described, the grain and material other than grain removed by the stripping rotor are propelled rearwardly to the auger 38 and are discharged rearwardly to a feeder house 64 that is provided with an auger 68 that moves the crop material laterally to a blower type elevator 100. The elevator elevates the crop to a rotary type precleaner 104 which separates most of the material other than grain from the grain, which is delivered to a conventional reciprocating cleaning shoe 124. The cleaning shoe is provided with a clean grain collection system and a tailing collection system, which collects the tailings and delivers the tailings to a rethresher 146, the rethreshed grain being recycled through the cleaning shoe 124.

As is apparent, the stripping type harvester collects far less material other than grain than conventional harvesters that sever the standing crop in the field, since the stripper type harvester leaves the stems in the field. The stripping mechanism replaces both the threshing cylinder and the separator of a conventional combine, the stripped grain and material other than grain only being further processed by a pair of grain cleaning mechanisms. The stripper type harvester is capable of ground speeds considerably higher than a conventional harvester provided with a reciprocating sickle type cutter bar. Thus, a stripper type harvester is effective where the crop is sparse and the machines needs to be operated at relatively high ground speed to fully utilize the capacity of the machine. The stripper type harvester is particularly effective in dry land areas where the crop is not very dense and has a relatively short and consistent height. The harvester illustrated herein is more effective in short crops wherein the grain bearing heads are at a relatively uniform height as opposed to longer stem crops where the crop is lodged or partially lodged so that the heads are interspersed throughout the crop.

We claim:

1. A harvesting machine for stripping seeds from a standing crop while substantially leaving the crop stems attached to the soil and comprising:

a mobile main frame adapted to advance over a field of standing crop;

a forwardly disposed header having opposite lateral sides, a transverse floor extending between the opposite sides, a rear wall having a crop discharge opening, an axially transverse stripping rotor extending between the opposite sides at the forward end of the fllor and including a plurality of stripping elements, the rotor being rotated so that the stripping elements move upwardly on the front side of the rotor and engage the seed bearing heads of the crop to separate the seeds and chaff from the crop stems by impact and deliver said crop material rearwardly above the floor, and a crop converging conveyor means extending between the opposite sides above the floor and rearwardly of the stripping rotor and adapted to receive the crop material removed from the stems, move it laterally on the header and discharge it rearwardly through the discharge opening;

means mounting the header on the main frame for vertical adjustment relative thereto;

a feeder housing extending rearwardly from the header in crop receiving relationship with the discharge opening and having an outlet and conveyor means for moving the crop material from the header discharge opening through the feeder housing outlet;

an elevator means having a rearward outlet mounted on the frame and a forward inlet commuicating with the feeder housing outlet and adapted to move the crop material from the feeder housing outlet through the elevator outlet;

a first crop cleaning means mounted on the frame and including a grate means, an outlet, (and) an impeller adapted to move crop material from the elevator outlet over the grate means so that the seeds fall through the grate means while a portion of the crop material lighter or longer than the seeds is discharged through the outlet and a blower means adapted to move air inwardly through the grate means to entrain lighter crop material and discharge it through the outlet;

a second cleaning means mounted on the frame below the first cleaning means and adapted to receive the crop material passing through the grate means and separate the seeds from other crop material, said second cleaning means including a clean grain collecting conveyor adapted to receive and convey the seeds separated by the second cleaning means and a tailings conveyor adapted to receive unthreshed seeds separated by the cleaning means and to convey them to an outlet;

a rethreshing means mounted on the frame and adapted to receive unthreshed seeds from the tailings conveyor, rethresh said material, and deliver the rethreshed material to one of the cleaning means; and drive means for driving the stripper rotor, the header conveyor means, the feeder house conveyor means, the elevator means, the cleaning means impeller and the rethreshing means.

2. The invention as defined in claim 1 and including a second rotor mounted on the header above and axially parallel to the stripping rotor, the drive means being operatively connected to the second rotor to drive it in the opposite direction from the stripping rotor.

3. The invention as defined in claim 1 wherein the feeder housing conveyor means includes an axially transverse rotary beater means adjacent the header discharge opening and an auger rearwardly of and parallel to the beater means and adapted to receive material from the beater and move it laterally to the elevator inlet.

4. The invention as disclosed in claim 3 wherein the auger comprises a plurality of axially extending bars attached to periphery of a plurality of axially spaced discs to form a cylindrical open center cage and spiral auger flighting attached to the bars on the exterior of the cage.

5. The invention as defined in claim 1 wherein the main frame is generally L-shaped and includes a fore-and-aft portion along one side of the header and a transverse portion behind the header and supported on wheel means, the cleaning means being mounted on the transverse portion.

6. A harvesting machine for stripping seeds from a standing crop while substantially leaving the crop stems attached to the soil and comprising:

a mobile main frame adapted to advance over a field of standing crop;

a forwardly disposed header having opposite lateral sides, a transverse floor extending between the opposite sides, a rear wall having a crop discharge opening, an axially transverse stripping rotor extending between the opposite sides at the forward end of the floor and including a plurality of stripping elements, the rotor being rotated so that the stripping elements move upwardly on the front side of the rotor and engage the seed bearing heads of the crop to separate the seeds and chaff from the crop's stems by impact and deliver said crop material rearwardly above the floor, and a crop converging conveyor means extending between the opposite sides above the floor and rearwardly of the stripping rotor and adapted to receive the crop material removed from the stems, move it laterally on the header, and discharge it rearwardly through the discharge opening;

means mounting the header on the frame for vertical adjustment relative thereto;

a feeder housing extending rearwardly from the header in crop receiving relationship with the discharge opening and having an outlet and conveyor means for moving the crop material from the header discharge opening through the feeder housing outlet; and crop cleaning means mounted on the frame and adapted to receive crop material from the feeder housing outlet to separate the seeds from the other crop material.

7. The invention defined in claim 6 wherein the crop cleaning means include an elevator means having a rearward outlet and a forward inlet communicating with the feeder housing outlet and adapted to move crop material from the feeder housing outlet through the elevator outlet, and the crop cleaning means includes a rotary crop cleaning means mounted on the frame and including a grate means, an outlet, and an impeller adapted to move crop material from the elevator outlet over the grate means so that the seeds fall through the grate means while a portion of the crop material lighter or larger than the seeds is discharged through the outlet.

8. The invention defined in claim 7 wherein the crop cleaning means include a second cleaner means mounted on the frame below the rotary cleaning means and adapted to receive the crop material passing through the grate means and separate the seeds from other crop material, said second cleaning means including a clean grain collecting conveyor adapted to receive and convey the seeds separated by the second cleaning means.

9. The invention defined in claim 8 wherein the second cleaning means includes a tailings conveyor adapted to receive unthreshed seeds separated by the cleaning means and a rethreshing means mounted on the frame and adapted to receive said unthreshed seeds from the tailings conveyor, rethresh said material, and deliver the rethreshed material to the inlet of cleaning means.

10. The invention defined in claim 6 wherein the frame is generally L-shaped and includes a fore-and-aft portion along one side of the header and a transverse portion behind the header and supported on wheel means, the cleaning means being mounted on the transverse portion.

11. The invention defined in claim 6 and including a second rotor mounted on the header above and axially parallel to the stripping rotor, the second rotor being driven in the opposite direction from the stripping rotor.

12. A harvesting machine for stripping seeds from a standing crop while substantially leaving the crop stems attached to the soil and comprising:

a mobile main frame adapted to advance over a field of standing crop;

a forwardly disposed header having opposite lateral sides, a transverse floor extending between the opposite sides, a rear wall having a crop discharge opening, an axially transverse stripping rotor extending between the opposite sides at the forward end of the floor and including a plurality of stripping elements, the rotor being rotated so that the stripping elements move upwardly on the front side of the rotor and engage the seed bearing heads of the crop to separate the seeds and chaff from the crop stems by impact and deliver said crop material rearwardly above the floor, and a crop converging open center auger extending between the opposite sides of the header above the floor and rearwardly of the stripping rotor for receiving crop material removed from the stems and moving the crop material laterally on the header for discharge rearwardly through the discharge opening, the open center auger including a plurality of axially extending bars attached to the periphery of a plurality of axially spaced discs to form a cylindrical open center cage and spiral flighting attached to the bars on the exterior of the open center cage;

means mounting the header on the frame for vertical adjustment relative thereto;

a feeder housing extending rearwardly from the header in crop receiving relationship with the discharge opening and having an outlet and conveyor means for moving the crop material from the header discharge opening to the feeder housing outlet; and a crop cleaning means mounted on the frame in crop receiving relationship with the feeder housing outlet and adapted to separate the seeds from other crop material removed from the stems by the stripping rotor.

* * * * *